May 24, 1938. T. ROBINSON 2,118,526
SURFACING
Filed Dec. 16, 1935
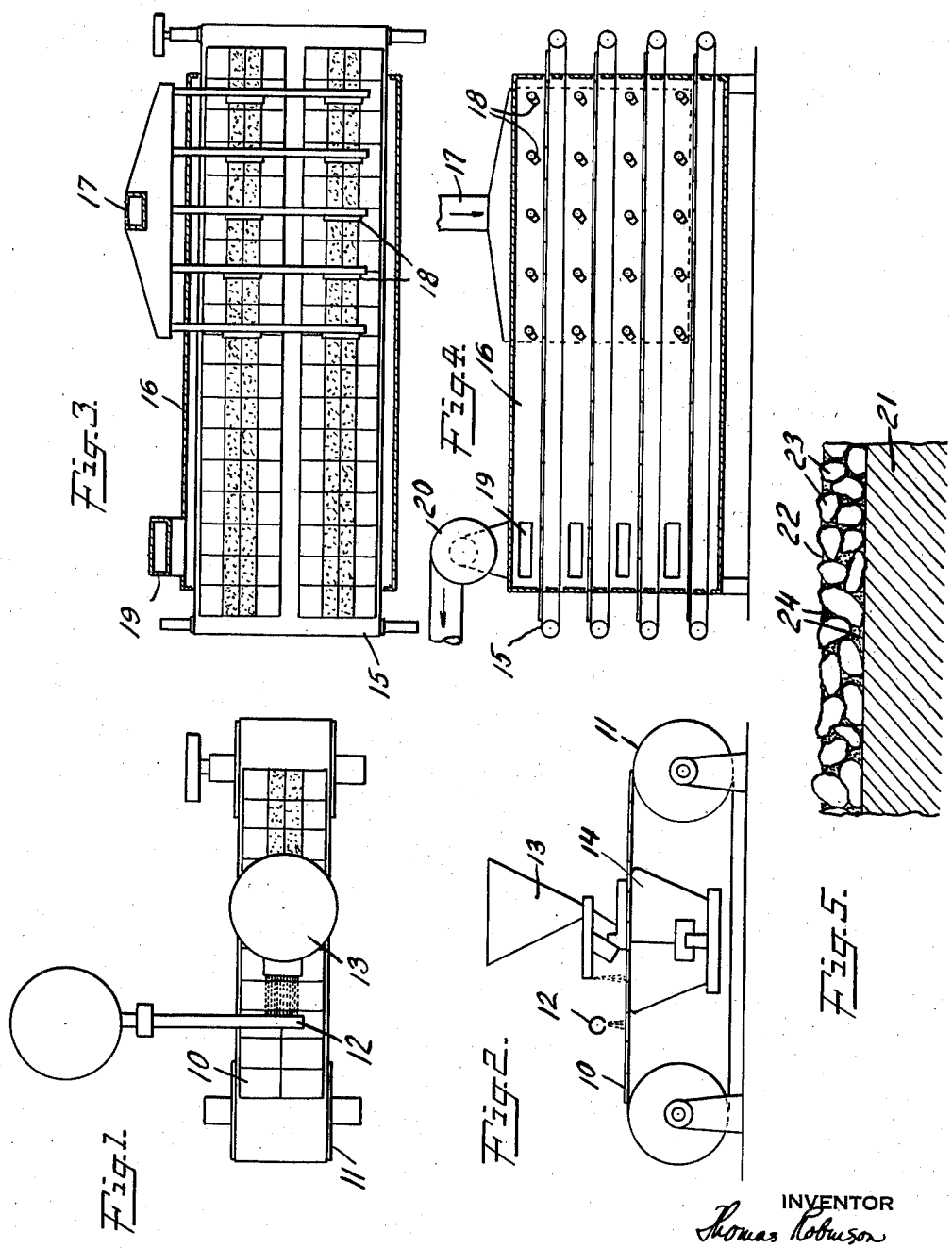
INVENTOR
Thomas Robinson
BY
Pennie, Davis, Marvin, Edmonds
ATTORNEYS Patented May 24, 1938

2,118,526

UNITED STATES PATENT OFFICE 2,118,526

SURFACING

Thomas Robinson, Smithtown, N. Y., assignor to Lancaster Processes, Inc., New York, N. Y., a corporation of New York Application December 16, 1935, Serial No. 54,643

7 Claims. (Cl. 91—68)

This invention relates to surfacings such as are employed on shingles of felt, wood, and metal, and as a coating for pipes and plain or corrugated metal sheets. More particularly, the invention is conerned with a novel surfacing which includes granular material held in place on the object to be surfaced by a bituminous adhesive, and a new method by which such a surfacing can be applied rapidly and at low cost.

The surfacing of the invention offers special advantages when employed in the manufacture of roofing elements, such as shingles made of plastic compositions or saturated felt. For purposes of explanation, therefore, the application of the invention to the surfacing of such shingles will be described in detail, but it is to be understood that the utility of the invention is not limited to the surfacing of such products, but is applicable to many others.

Prepared roofing consisting of a body of rag or asbestos felt saturated with asphalt has been commonly surfaced or coated heretofore by the application to the surface of the felt of a layer of molten asphalt of the desired melt point. This layer of asphalt is applied by advancing the sheet through a coating mechanism, after which the coated sheet is passed beneath a hopper and a layer of the granules of surfacing material, such as crushed slate, is distributed over the coating. The sheet then passes between rolls which partly embed the granules in the coating so that when the coating hardens and sets, the embedded granules are anchored in position.

While this method of surfacing is widely used, it is not wholly satisfactory because the surface so produced is not fire-resistant, and the asphalt layer will run upon application of a flame of relatively low temperature. Also, the granules are not securely anchored in place and become dislodged, both in the handling of the material and during its use.

The present invention is, accordingly, directed to the provision of a novel surfacing which is superior to those heretofore used in that it is of better appearance, of greater durability, has an increased fire resistance, and is less susceptible to temperature changes. According to the invention, the article to be surfaced is first coated with a high melt point oxidized asphalt which has been cut back with a volatile solvent and filled with an inorganic material, such as amorphous silica. Over this coating, granules of the desired surfacing material are spread before the solvent evaporates, so that the granules settle into the coating and are thoroughly coated. The granular material is applied in such quantities that a layer of granules appears on the top of the coating with the exposed surfaces of the granules uncoated by asphalt. Thereafter, upon evaporation of the solvent, there remains an asphalt film loaded with granules and silica and having an exposed surface of granules strongly bound in place by an asphalt film.

In applying the new surfacing, it is desirable to insure that the granular material will settle into the coating, and this result can best be obtained by vibrating the articles to be surfaced after the application of the granular material thereto. For this purpose, various forms of apparatus may be employed. After the application of the granular material, and the settling of the granules thereof into the asphalt film, the particles become effectively bonded when the solvent evaporates. In order to recover the solvent, it is preferably evaporated in a chamber into which warm air is introduced and exhausted, the solvent being then recovered from the air current in the usual way.

For a better understanding of the invention, reference may be had to the accompanying drawing, in which suitable apparatus for practicing the new method is disclosed. In the drawing, Figures 1 and 2 are plan and elevational views, respectively, of the coating apparatus;

Figures 3 and 4 are top plan and longitudinal sectional views, respectively, of the apparatus for extracting the solvent; and Figure 5 is a sectional view through an object provided with the new surfacing.

In carrying on the new method, the articles 10 to be surfaced, which may, for example, be roofing elements, such as shingles, are placed on a conveyor 11 and passed beneath a distributing nozzle 12, by which cut-back asphalt is applied thereto. The entire surfaces of the elements may be coated, or if desired, and as shown, the asphalt is directed by the nozzle on portions only of the elements.

The asphalt used may be, for example, blown or oxidized asphalt of 180° F. melt point, cutback with an equal weight of gasoline, and the cut-back has mixed with it about 20% of its weight of diatomaceous earth. The mixture is applied to the elements to form a coating which may be, for example, about $\frac{1}{32}$" thick.

After the shingles are thus coated, they are carried along by the conveyor beneath a distributing hopper 13 containing the desired granular surfacing material which may be, for example, crushed slate or quartz, or any of the other granular surfacings commonly used for the purpose. The hopper is provided with a distributing mechanism of the usual sort to insure the application of an even layer of the granular material to the shingles, and beneath the hopper is a vibrating device 14 of standard construction which causes the conveyor with the elements thereon to vibrate up and down at a rapid rate. The granular material then settles into the asphalt film both by its own weight and as a result of the action of the vibrator. The solvent present acts as an introfier, aiding the asphalt to wet the granules effectively so that they are effectively bonded in place. The vibration also insures that the granules will be closely packed together.

The amount of the granular material employed is such that the granules fill the asphalt film and provide a top layer, the exposed surfaces of which are uncoated by the asphalt. The appearance of the finished coating is thus determined by the color characteristics of the granules employed.

Upon leaving the conveyor 11, the coated shingles are treated to extract the solvent from the asphalt film, and for this purpose, the shingles may be passed on conveyors 15 through a chamber 16 to which hot air is supplied by a pipe 17, the air being directed against the surface of the shingles on the conveyors by nozzle 18. The hot air is introduced into the extracting chamber at one end thereof, and at the other end are exhaust pipes 19 connected to a blower 20.

On emerging from the extracting apparatus, the asphalt film has hardened and set to a considerable degree, and the surface layer on the shingles has the form illustrated in Figure 5. In this view, the shingle 21 is shown as provided with a film 22 of asphalt into which granules 23 have been submerged, wholly or in part. The asphalt contains the particles 24 of finely divided siliceous material which lie in the small bodies of asphalt between adjacent granules. By reason of the introfying action of the solvent, the asphalt has been caused to wet the granules thoroughly so that the asphalt adheres firmly thereto and bonds the granules strongly in place. The exposed surface of the coating consists primarily of the granular material and its color, therefore, depends on the color of the granules employed.

While the application of the new surfacing has been described as involving the spraying of the cut-back on the surface to be coated, it is to be understood that the adhesive material may be applied in other ways, as by brushing. Also, the extraction of the solvent in the manner described is not necessary since the solvent will naturally evaporate, but the use of an extracting apparatus is preferred because it permits the solvent to be recovered.

The new surfacing can be used for many purposes, as, for example, on shingles of felt, wood, and metal, and as a coating for pipes and on plain or corrugated metal sheets, particularly those which must be bent after having been coated. The coating is cheap and easy to apply, and it has a long life since the use of the solvent insures that the asphalt will thoroughly wet the granules and effectively bond them in place.

I claim:

1. A method of surfacing an article which comprises coating the article with a fluent mixture consisting of a relatively high melt point oxidized asphalt, an added, cut-back, volatile solvent for the asphalt, and finely divided inorganic filler, distributing granular material over the coating so formed, and vibrating the article to cause the granular material to sink into the coating.

2. A method of coating an article which comprises coating the article with a fluent mixture consisting of a relatively high melt point oxidized asphalt, an added, cut-back, volatile solvent for the asphalt, and finely divided inorganic filler, distributing granular surfacing material over the coating so formed, and vibrating the article to cause the granular material to sink into the coating except for a surface layer of the granular material, the particles of which are only partially embedded in the coating.

3. A method of surfacing an article which comprises coating the article with a fluent mixture consisting of a relatively high melt point oxidized asphalt, gasolene for cutting back the asphalt, and amorphous silica as a filler, distributing granular surfacing material over the coating so formed, and causing the granular material to sink into the coating.

4. A coated article which comprises a base and a coating thereon, said coating consisting of a film formed by evaporation of solvent from a fluent mixture consisting of a relatively high melt point oxidized asphalt, an added, cut-back, volatile solvent for the asphalt, and a finely divided inorganic filler, and granular material, certain of the granules of which are submerged in said film, the others being partially embedded in said film and providing an exposed granular surface on said film.

5. A coated article which comprises a base and a coating thereon, said coating consisting of a film formed by evaporation of solvent from a fluent mixture consisting of a relatively high melt point oxidized asphalt, an added, cut-back, volatile solvent for the asphalt, and about 20% by weight of a finely divided inorganic filler, and granular material, certain of the granules of which are submerged in said film, the remaining granules being partially embedded in said film and providing an exposed granular surface.

6. A coated article which comprises a base and a coating thereon, said coating consisting of a film formed by evaporation of solvent from a fluent mixture consisting of oxidized asphalt of approximately 180° F. melt point, an added, cut-back, volatile solvent for the asphalt, and about 20% by weight of amorphous silica distributed therethrough as a filler, and granular material, certain of the granules of which are submerged in said film, the remaining granules being partially embedded in said film and providing an exposed granular surface.

7. A coated article which comprises a base and a coating thereon, said coating consisting of a film of relatively high melt point oxidized asphalt, an added, cut-back, volatile solvent for the asphalt, about 20% by weight of diatomaceous earth distributed therethrough as a filler, and crushed slate, certain of the granules of which are submerged in said film, the remaining granules being partially embedded in said film and providing an exposed granular surface.

THOMAS ROBINSON.